United States Patent
Carlin et al.

(10) Patent No.: US 10,246,185 B2
(45) Date of Patent: Apr. 2, 2019

(54) AIRCRAFT SYSTEM AND METHOD FOR VERTICAL TAKEOFF AND LANDING

(71) Applicant: PANASONIC INTELLECTUAL PROPERTY MANAGEMENT CO., LTD., Osaka (JP)

(72) Inventors: Casey Joseph Carlin, San Jose, CA (US); Luca Rigazio, Los Gatos, CA (US); Alexander Joseph Romelfanger, Alamo, CA (US)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 85 days.

(21) Appl. No.: 15/633,174

(22) Filed: Jun. 26, 2017

(65) Prior Publication Data
US 2017/0369163 A1    Dec. 28, 2017

Related U.S. Application Data

(60) Provisional application No. 62/355,054, filed on Jun. 27, 2016.

(51) Int. Cl.
*B64C 29/02* (2006.01)
*B64C 11/48* (2006.01)
(Continued)

(52) U.S. Cl.
CPC .............. *B64C 29/02* (2013.01); *B64C 11/48* (2013.01); *B64C 39/024* (2013.01);
(Continued)

(58) Field of Classification Search
CPC ....... B64C 29/02; B64C 11/48; B64C 39/024; B64C 2201/108; B64C 2201/021; G05D 1/0858
See application file for complete search history.

(56) References Cited

U.S. PATENT DOCUMENTS

| 6,293,491 B1 * | 9/2001 | Wobben ................. B64C 27/00 244/17.23 |
| 2008/0149759 A1 * | 6/2008 | Walliser ................. B64C 27/24 244/17.11 |

(Continued)

OTHER PUBLICATIONS

"PlueOne Operating Manual", dated Sep. 2, 2016, 29 pgs (retrieved Jun. 22, 2017).
(Continued)

*Primary Examiner* — Mussa A Shaawat
(74) *Attorney, Agent, or Firm* — McDermott Will & Emery LLP

(57) ABSTRACT

An aircraft having a fixed wing is operative to perform vertical takeoff and landing while positioned in a nose-down orientation. The aircraft has a fixed wing having a leading edge and a trailing edge; a propulsion system operative to selectively provide forward propulsion and rearward propulsion; and a controller operative to control operation of the propulsion system. The propulsion system provides rearward propulsion during takeoff of the aircraft to move the aircraft in a direction of the trailing edge of the fixed wing, and provides forward propulsion during flight of the aircraft to move the aircraft in a direction of the leading edge of the fixed wing. The aircraft maintains the wing substantially vertical with the trailing edge facing upwards during takeoff, and transitions to having the wing substantially horizontal during flight. A vertical landing procedure is also provided.

19 Claims, 8 Drawing Sheets

(51) Int. Cl.
*B64C 39/02* (2006.01)
*G05D 1/08* (2006.01)

(52) U.S. Cl.
CPC ...... *G05D 1/0858* (2013.01); *B64C 2201/021* (2013.01); *B64C 2201/104* (2013.01); *B64C 2201/108* (2013.01)

(56) References Cited

U.S. PATENT DOCUMENTS

| | | | |
|---|---|---|---|
| 2010/0025543 A1* | 2/2010 | Kinsey | B64C 29/02 244/7 A |
| 2014/0312177 A1* | 10/2014 | Gaonjur | B64C 27/24 244/7 A |
| 2017/0300065 A1* | 10/2017 | Douglas | G05D 1/0676 |
| 2017/0300066 A1* | 10/2017 | Douglas | B64C 29/0008 |
| 2017/0300067 A1* | 10/2017 | Douglas | B64C 29/0025 |

OTHER PUBLICATIONS

"EBee senseFly", <https://www.sensefly.com/drones/ebee.html>, eBee: senseFly SA, 7pgs (retrieved Jun. 22, 2017).
"X PlusOne Drone—xCraft", <http://xcraft.io/x-plusone-drone/>, 4 pgs (retrieved Jun. 22, 2017).
"EBee—senseFly—The professional mapping drone", 16 pgs (retrieved Jun. 22, 2017).

* cited by examiner

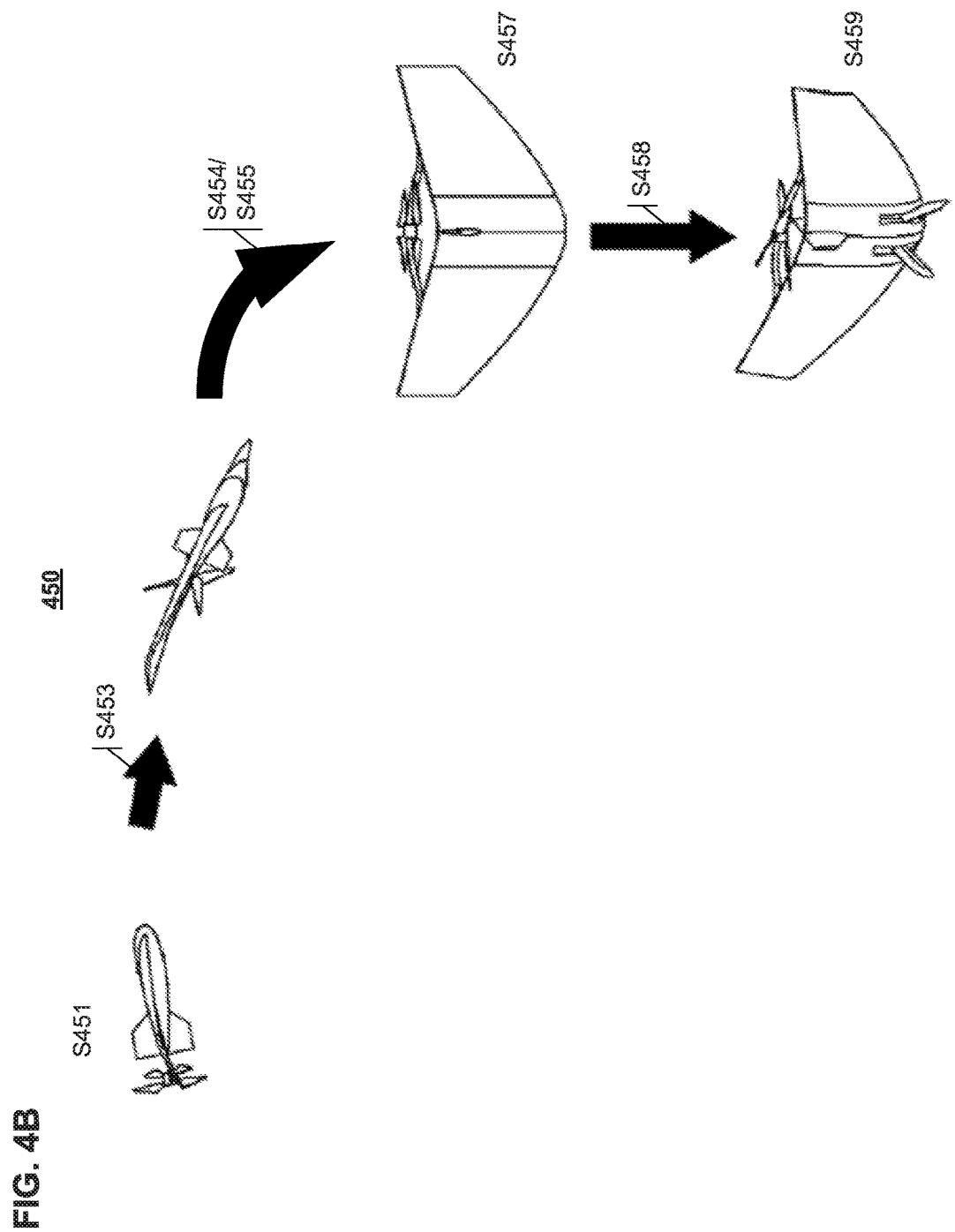

AIRCRAFT SYSTEM AND METHOD FOR VERTICAL TAKEOFF AND LANDING

CROSS-REFERENCE TO RELATED APPLICATION

This application claims the benefit of U.S. Provisional Patent Application No. 62/355,054, filed on Jun. 27, 2016 in the U.S. Patent and Trademark Office, the disclosure of which is incorporated by reference in its entirety.

TECHNICAL FIELD

The present subject matter relates to aircraft systems and control methods for vertical takeoff and landing of aircraft including fixed-wing aircraft.

BACKGROUND

Remotely controlled and/or autonomously controlled aircraft, generally referred to as drones, are used in a wide range of applications. For example, drones are commonly used for surveillance purposes. In such examples, the drones may be expected to remain in flight for long periods of time.

In general, drone aircraft are either helicopter-type aircraft that take off and land vertically, or fixed-wing aircraft that require an extended open space (e.g., tens or hundreds of meters) for takeoff and landing. The helicopter-type aircraft, also referred to as "quadcopters" or "multicopters," require substantial energy expenditure to hover and remain aloft, and thus generally cannot perform flights of more than thirty to fifty minutes. In particular, the flight time is limited in battery-powered multicopter aircraft because of the low energy density of modern electrical energy storage technologies such as lithium-ion batteries. Multicopters further have low maximum flight speeds which, combined with short flight times, severely restrict the geographical area over which they can perform surveillance.

In contrast, fixed-wing aircraft can remain aloft for extended periods of time with relatively lower energy expenditure. However, as noted above, they require an extended open space for takeoff and landing.

Specialized fixed-wing aircraft that do not need a large footprint to take off have been developed. However, such aircraft require the use of a ground-based propulsion system to take off (e.g., a linear catapult), require separate power systems for hovering and flying (a plane/helicopter hybrid), or require power systems that change orientation (for example, a tiltrotor). These approaches suffer from several disadvantages stemming from complicated mechanical systems and/or excess weight. The complicated mechanical systems increase maintenance costs as there are more parts to break. The greater weight forces the designer to increase the overall size of the aircraft or the minimum speed at which the aircraft has to operate to avoid stalling. The increase in weight also increases parasitic drag upon the aircraft, and thereby increases the energy required to carry out flight missions and cuts back on flight time. These disadvantages are further magnified in aircraft using an electric power train due to the low energy density available in electrical energy storage technologies.

A need therefore exists for a fixed-wing aircraft capable of remaining aloft for an extended period of time, and capable of vertical takeoff and landing. Such an aircraft could advantageously be used, for example, but not limited to, for surveillance purposes or the delivery of items in locations where there is no room for a sufficient airstrip (e.g., protected wilderness, national parks, dense cities).

SUMMARY

The disclosure herein alleviates one or more of the above noted drawbacks of existing aircrafts.

In accordance with an aspect of the disclosure, an aircraft includes a fixed wing having a leading edge and a trailing edge, a propulsion system operative to selectively provide forward propulsion and rearward propulsion, and a controller. The controller is operative to control operation of the propulsion system to provide rearward propulsion during takeoff of the aircraft to move the aircraft in a direction of the trailing edge of the fixed wing, and to provide forward propulsion during flight of the aircraft to move the aircraft in a direction of the leading edge of the fixed wing.

In accordance with another aspect of the disclosure, a method includes activating a propulsion system of an aircraft having a fixed wing to provide rearward propulsion of the aircraft during takeoff and move the aircraft vertically upward in a direction of a trailing edge of the fixed wing. An altitude of the aircraft is monitored during the takeoff. Upon determining that the aircraft has reached a predetermined altitude threshold, the propulsion system is caused to provide forward propulsion to the aircraft and move the aircraft in a direction of a leading edge of the fixed wing opposite to the trailing edge.

In accordance with a further aspect of the disclosure, a method includes activating a propulsion system of an aircraft having a fixed wing to provide forward propulsion of the aircraft during flight of the aircraft and maintaining the fixed wing in a substantially horizontal position. The aircraft is transitioned to a hovering or vertically descending mode by performing steps for de-activating the propulsion system providing forward propulsion, controlling the aircraft to perform a nose-dive with the fixed wing in a substantially vertical position and a nose of the aircraft pointed downwards, and activating the propulsion system to provide rearward propulsion to the aircraft to slow movement of the aircraft vertically downwards with the nose of the aircraft pointed downwards.

Additional advantages and novel features will be set forth in part in the description which follows, and in part will become apparent to those skilled in the art upon examination of the following and the accompanying drawings or may be learned by production or operation of the examples. The advantages of the present disclosure may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present disclosure, by way of example only, not by way of limitation. In the figures, like reference numerals refer to the same or similar elements.

FIGS. 4A and 4B are diagrams respectively illustrating the vertical takeoff and vertical landing of the aircraft of FIG. 1A.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, components, and/or circuitry have been described at a relatively high-level, without detail, in order to avoid unnecessarily obscuring aspects of the present disclosure.

The various aircraft systems and control methods disclosed herein relate to vertical takeoff and landing of aircraft including fixed-wing aircraft.

The system and methods provide an aircraft or aircraft system designed, for example, for real-time monitoring of large geographical areas including densely populated or protected areas in which no landing strip is available. The aircraft, also referenced as a drone or craft, is a fixed-wing aircraft that is capable of vertical takeoff and landing (VTOL). The aircraft system includes the aircraft and associated base station (or base) configured to charge the aircraft and enable transfer of data to/from the aircraft (e.g., for transfer of large quantities of data that cannot effectively be transmitted over wireless or radio links).

In an illustrative embodiment, the aircraft utilizes two co-axial contra-rotating propellers to lift off the ground tail-first. Once airborne, the aircraft uses specialized motor controllers to reverse thrust, execute a dive, and level out into horizontal flight. The aircraft thus performs hovering maneuvers for limited space takeoff and landing, but is nonetheless capable of extended flight time because of its fixed-wing structure. In various embodiments, innermost control flaps of the aircraft, which are used to control lift during horizontal flight, are positioned directly in front of the propellers such that they can be used to vector propeller thrust during vertical maneuvering. The reuse of the same control surfaces for vertical takeoff and horizontal light provides for a simpler and lighter aircraft.

In order for the aircraft to perform its nose-down takeoff position, the aircraft features extending landing gear embedded in its nose. Additionally, the aircraft can interact with a base station to recharge and/or transfer recorded flight data and other flight information. The craft may be able to land in and lift off from the base station to facilitate autonomous charging and data transfer.

Reference now is made in detail to the examples illustrated in the accompanying drawings and discussed below.

Figure 1A:
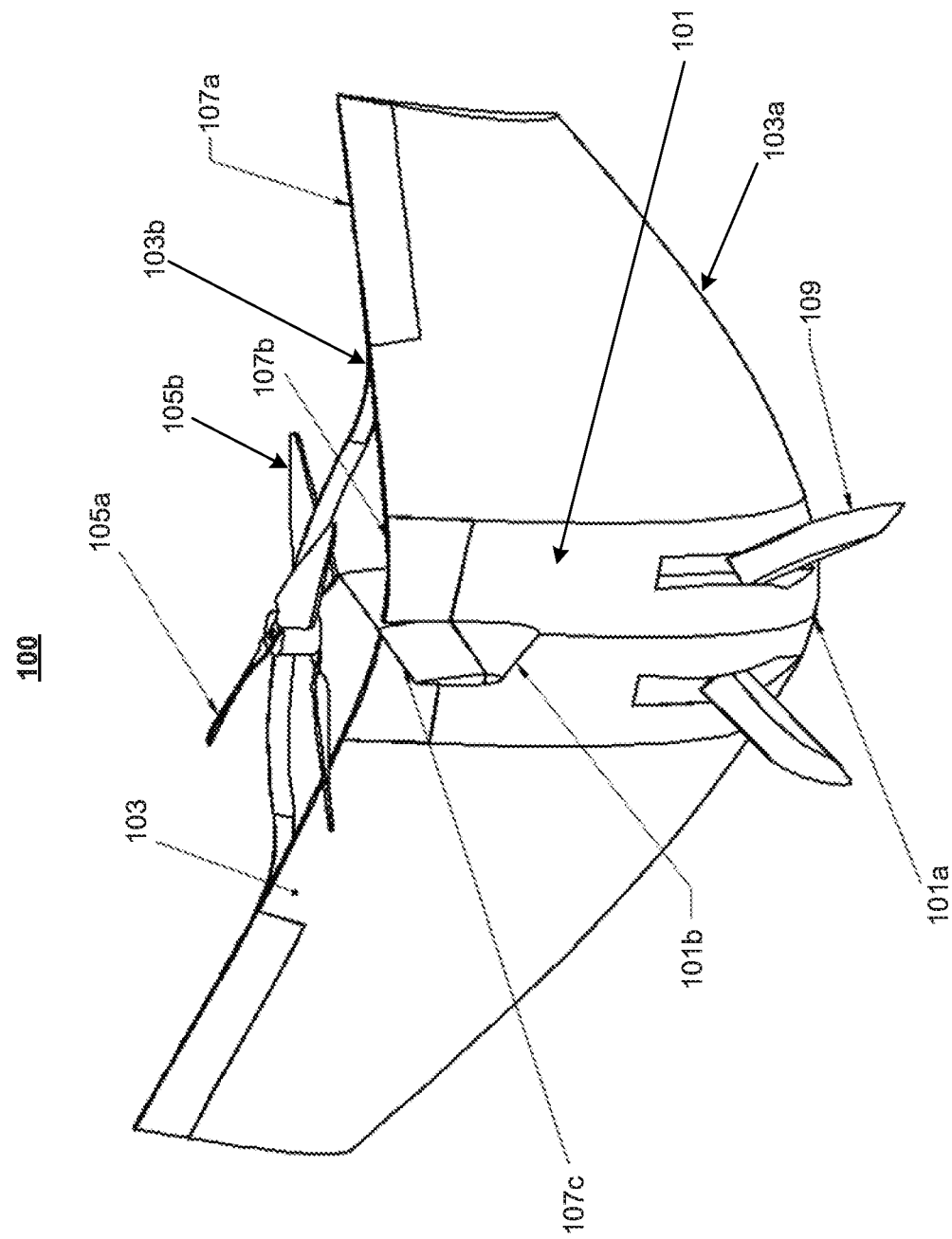
FIGS. 1A-1G show multiple views of an exemplary fixed wing aircraft configured to perform vertical takeoff and landing (VTOL).
Figure 1B:
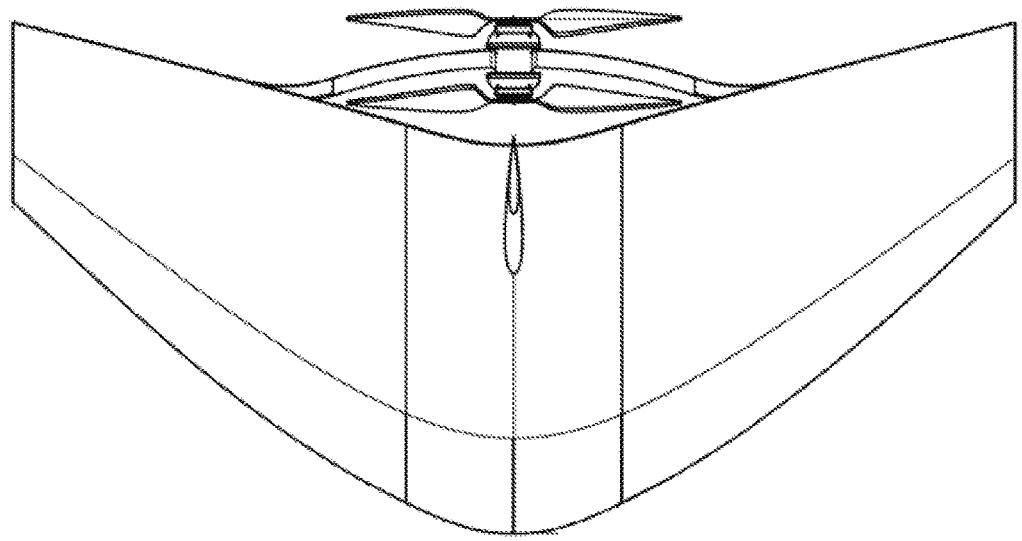
Figure 1C:
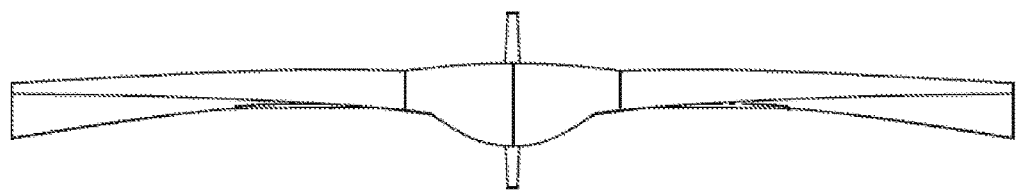
Figure 1D:
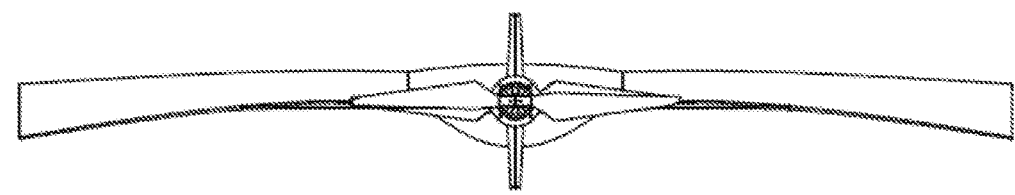
Figure 1E:
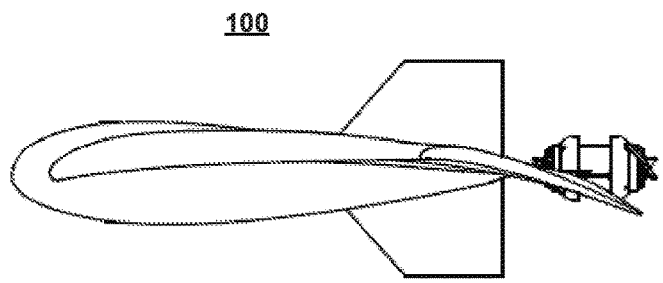

FIG. 1A shows an illustrative aircraft 100 configured to operate in accordance with the principles of the invention. The aircraft 100 includes a body 101 (e.g., fuselage), a wing 103, and a propulsion system including at least two propellers 105a and 105b. The wing 103 generally has a fixed position relative to the body 101 and can be referred to as a fixed-wing. The propulsion system further includes one or more motors (see FIG. 2) operative to power the at least two propellers 105a and 105b and operates under the control of a controller (see FIG. 2). In general, an even number of propellers 105a and 105b are provided in pairs of two, and propellers in each pair are contra-rotating propellers configured to turn in opposite directions. For this purpose, gearing can be used to cause a same motor to cause the propellers 105a and 105b to turn in opposite directions; alternatively or additionally, two or more separate motors can be used and the controller then ensures that the propellers 105a and 105b turn in directions opposite to each other (e.g., when one propeller turns clockwise, the other propeller turns counterclockwise).

As shown, the body 101 has a nose 101a and a tail 101b (or tail wing). Additionally, the wing 103 has a leading edge 103a and a trailing edge 103b opposite to the leading edge 103a. The nose 101a and leading edge 103a are positioned at the front of the aircraft 100 when the aircraft 100 moves in a forward flight direction in which the wing 103 generates lift as a result of airflow around the wing 103. In contrast, the tail 101b and trailing edge 103b are positioned opposite to the nose 101a and leading edge 103a along the forward flight direction of the aircraft 100, and as such are positioned at the rear of the aircraft 100 when the aircraft 100 moves in the forward flight direction in which the wing 103 generates lift as a result of airflow around the wing 103.

The aircraft 100 further includes ailerons, flaps, or the like (generally referenced as control surfaces 107) that are movable with respect to the body 101, fixed-wing 103, and/or tail 101b. The control surfaces 107 are moved under the control of the controller, and are used to steer or otherwise change the orientation of the aircraft 100 during flight. The control surfaces 107 can include, for example, ailerons 107a (e.g., wing-mounted control surfaces), wing-mounted thrust-vectoring control flaps 107b, tail-mounted thrust-vectoring control flaps 107c, and the like.

Finally, the aircraft 100 includes an extending landing gear 109 positioned at or near the nose 101a of the aircraft 100. The landing gear 109, shown extended in the view of FIG. 1A, is extended during takeoff and landing of the aircraft 100. The landing gear 109 can further be retracted and stowed during flight.

Figure 1F:
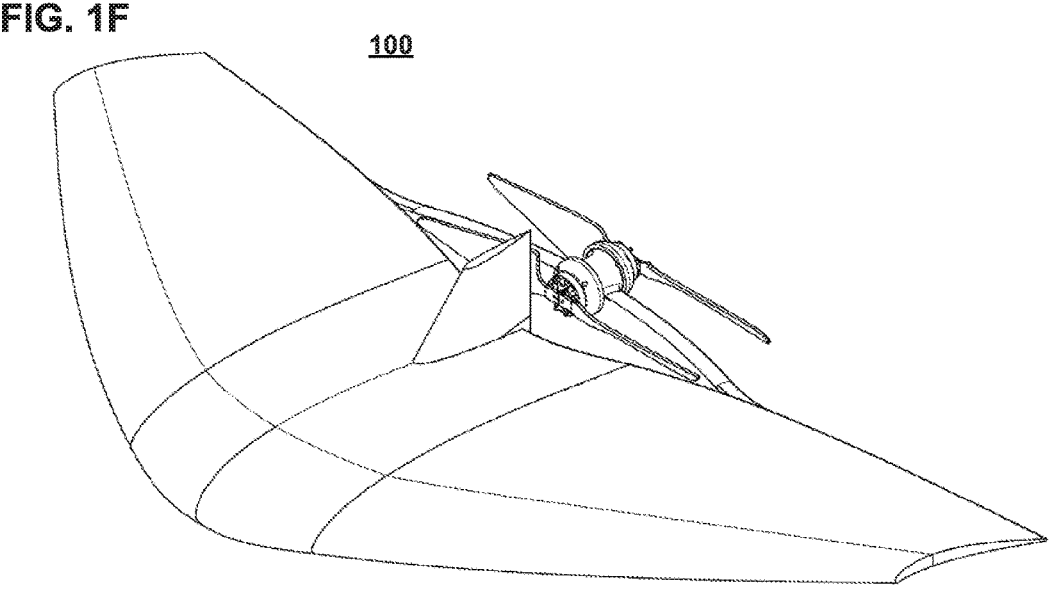
Figure 1G:
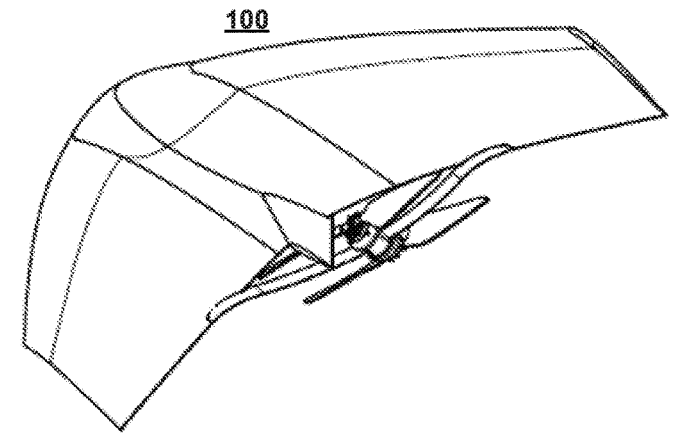

FIGS. 1B-1G show additional views of the aircraft 100. In particular, FIGS. 1B-1E respectively show a top view, a front view, a rear view, and a side view of the aircraft 100. Moreover, FIG. 1F shows an oblique view showing the upper surface of the aircraft 100 when the aircraft is in flight and in a horizontal position, and FIG. 1G shows another oblique view showing the lower surface of the aircraft 100 when the aircraft is in flight and in a horizontal position. In one example, the aircraft 100 has a wingspan (tip-to-tip) of approximately 1147.5 mm; a total length (nose 101a to rearmost structure) of approximately 590 mm; a maximum body/wing thickness of 93 mm; a maximum tail height of 200 mm; and propellers with tip-to-tip lengths of 381 mm. The cited dimensions are approximate and may vary within a reasonable range (e.g., +/−5%, +/−10%, or the like). Moreover, the cited dimensions correspond to just one illustrative aircraft and are not limiting. In particular, larger and/or smaller aircraft fall within the scope of the disclosure.

The aircraft 100 is configured to operate in two flight modes. In a first 'wing-flight' mode, the aircraft 100 moves with the nose 101a and leading edge 103a of the wing 103 positioned forward along the direction of movement of the aircraft 100. In this first flight mode, the aircraft 100 can move in a forward flight direction with the wing 103 positioned substantially horizontally. In such a horizontal flight mode, if the aircraft 100 maintains sufficient flight speed, the wing 103 generates lift as a result of airflow around the wing 103. The wing 103 and control surfaces 107 function similarly to the wing, wing flaps, and tail flaps of a fixed-wing aircraft in the wing-flight mode.

In a second 'hovering-flight' mode, the aircraft 100 is positioned with its tail 101b pointed substantially vertically upwards and its nose 101a pointed substantially vertically downwards. The orientation of the aircraft 100 shown in FIG. 1A is the orientation generally assumed by the aircraft in the hovering-flight mode. In the hovering-flight mode, the propellers 105a and 105b function similarly to the rotor of a helicopter to provide lift to the aircraft 100 and enable the aircraft 100 to hover in place, ascend or descend substantially vertically, and move laterally while hovering, ascending, or descending. In the hovering flight mode, rotation of the propellers 105a and 105b generate upward thrust. Additionally, in this mode, the wing-mounted thrust-vectoring control flaps 107b and tail-mounted thrust-vectoring control flaps 107c are disposed within the line of thrust of the propellers 105a and 105b. As such, movement of the control flaps 107b and 107c (e.g., under control of the aircraft's controller) can cause deviation of the generated thrust; such thrust vectoring can be used to provide control of the aircraft flight direction and orientation in the hovering flight mode.

As shown in the example of FIG. 1A, the propellers 105a and 105b are co-axial and positioned at the tail 101b. The positioning of the propellers is illustrative, and alterative positioning can be provided in other embodiments. The propellers 105a and 105b have fixed blade pitch in the embodiment shown in FIG. 1A. However, in alternative embodiments, propellers 105a and 105b with variable or adjustable pitch can be used. The blade pitch is generally maintained equal on all propellers 105a and 105b of each pair of propellers used in the aircraft. The blade pitch, when variable, can be adjusted under control of the controller of the aircraft 100.

In both the wing-flight and hovering-flight mode, the propellers 105a and 105b are controlled to rotate in opposite directions with respect to each other. Moreover, the propeller 105a rotates in one direction (e.g., clockwise) in the wing-flight mode, and in the opposite direction (e.g., counter-clockwise) in the hovering-flight mode. Similarly, the propeller 105b rotates in the other direction (e.g., counter-clockwise) in the wing-flight mode, and in the opposite direction (e.g., clockwise) in the hovering-flight mode. The controller of the aircraft 100 controls the operation and rotation direction of the propellers 105a and 105b in both flight modes.

Figure 2:
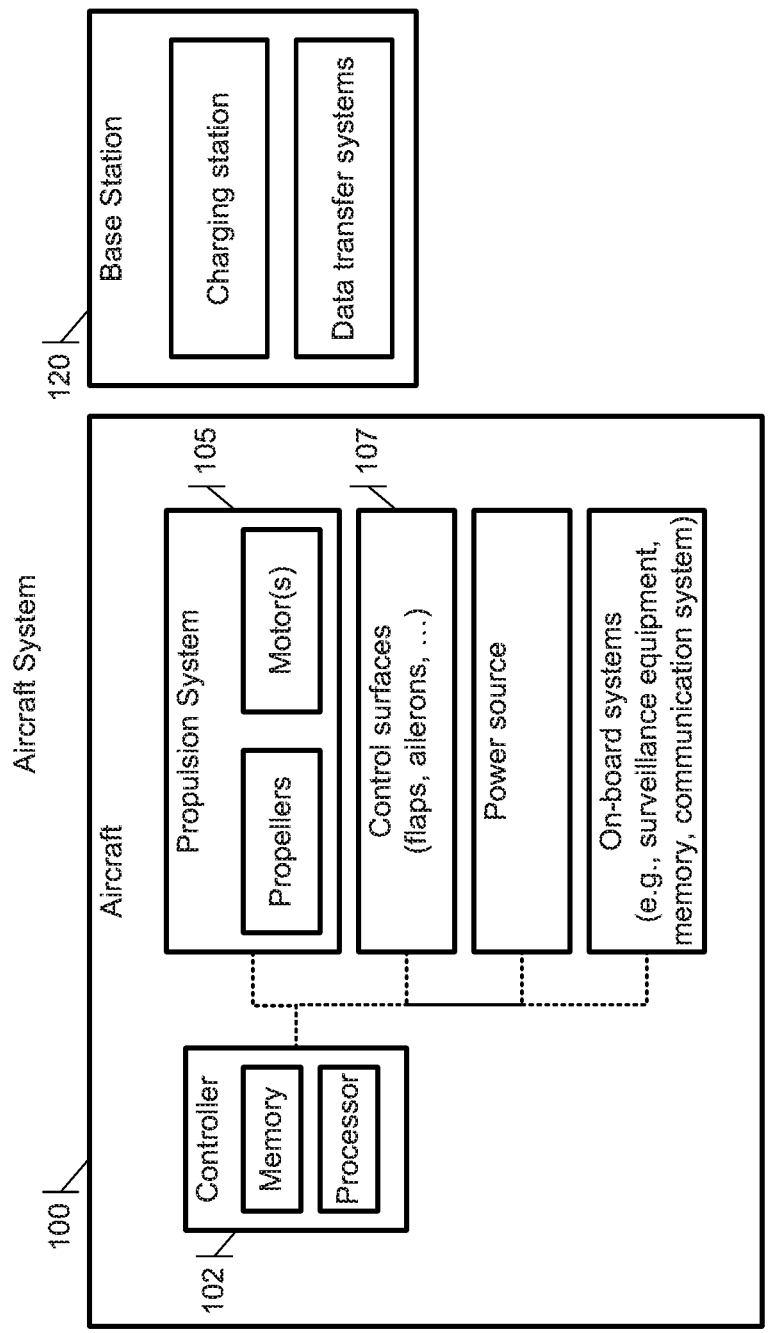
FIG. 2 is a high-level functional block diagram showing components of an exemplary aircraft and base station forming an aircraft system.

FIG. 2 is a high-level functional block diagram showing various components of the aircraft 100 including the aforementioned propulsion system 105 (including propellers 105a and 105b and one or more motor(s)) and control surfaces 107 (including actuators or motors operative to move the control surfaces) that operate under the control of a controller 102. The controller 102 includes a processor (e.g., microprocessor) and memory storing executable program code for causing the controller to perform the various functions described herein.

The aircraft 100 further includes a power source, for example a battery or battery system for providing electrical power to the controller 102, propulsion system 105, control surfaces 107, and other aircraft systems. Additionally, the aircraft 100 can include on-board systems including surveillance equipment (e.g., cameras and other sensors), memory for storing surveillance or other data, a communication system for communication through a wired and/or wireless link with a base station, and the like.

Figure 3:
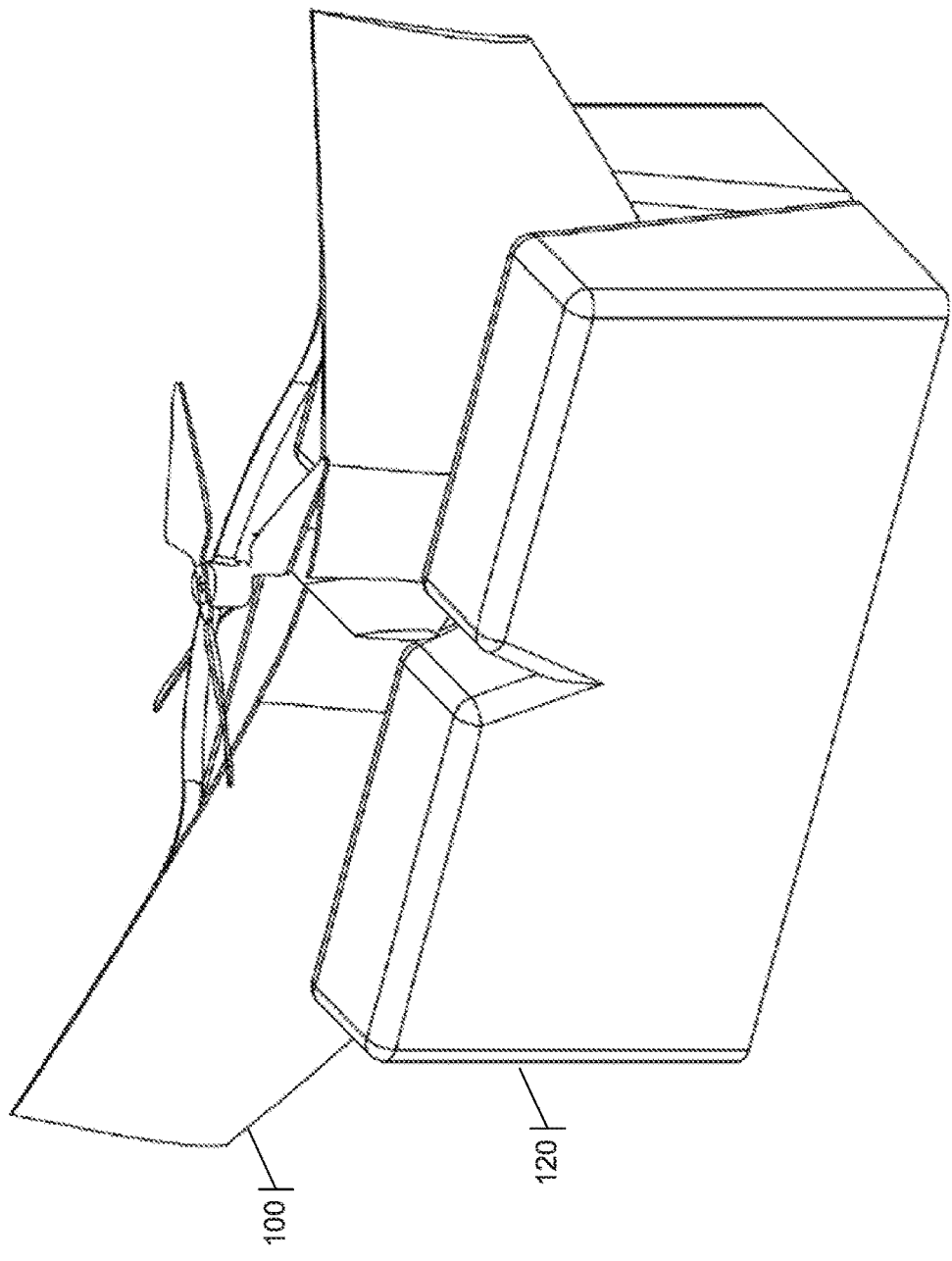
FIG. 3 shows a view of the exemplary fixed wing aircraft mounted within a base station.

The aircraft 100 can form part of an aircraft system together with a base station 120. An illustrative base station 120 is shown in FIG. 3. FIG. 3 shows the aircraft 100 positioned within the base station 120. The base station 120 can serve as a support or cradle for holding the aircraft 100 when the aircraft is not in flight or airborne. The base station 120 is operable to charge the aircraft 100 when the aircraft 100 is positioned therein. The charging is used to recharge the power source of the aircraft 100 through a wired connector or wireless charging connection between the base station 120 and aircraft 100.

The base station 120 also includes data transfer systems configured to communicate with systems onboard the aircraft 100. The data transfer systems can communicate with systems onboard the aircraft 100 through wireless communications (e.g., when the aircraft is in flight) or through high throughput wired and/or wireless communications (e.g., when the aircraft 100 is positioned in the base station 120). The data transfer systems are used to download surveillance or other sensing data from the aircraft 100, including flight monitoring and sensing data that can be used to monitor flight performance and improve flight control systems. The data transfer systems can also be used to upload upgraded software to the aircraft 100 including aircraft control software (e.g., program instructions for changing operation of the controller 102) and surveillance control software (e.g., program instructions for changing operation of the other on-board systems).

The aircraft 100 can be configured to automatically locate the base station 120 and to land upon the base station 120. After having landed on the base station 120, the aircraft 100 can automatically recharge batteries and transfer flight and surveillance data. The aircraft 100 can locate the base station 120 with a combination of a global positions system (GPS), an ultra-wide-band (UWB) transceiver, and/or optical positioning, and can navigate autonomously to effect a vertical landing thereon.

Figure 4A:
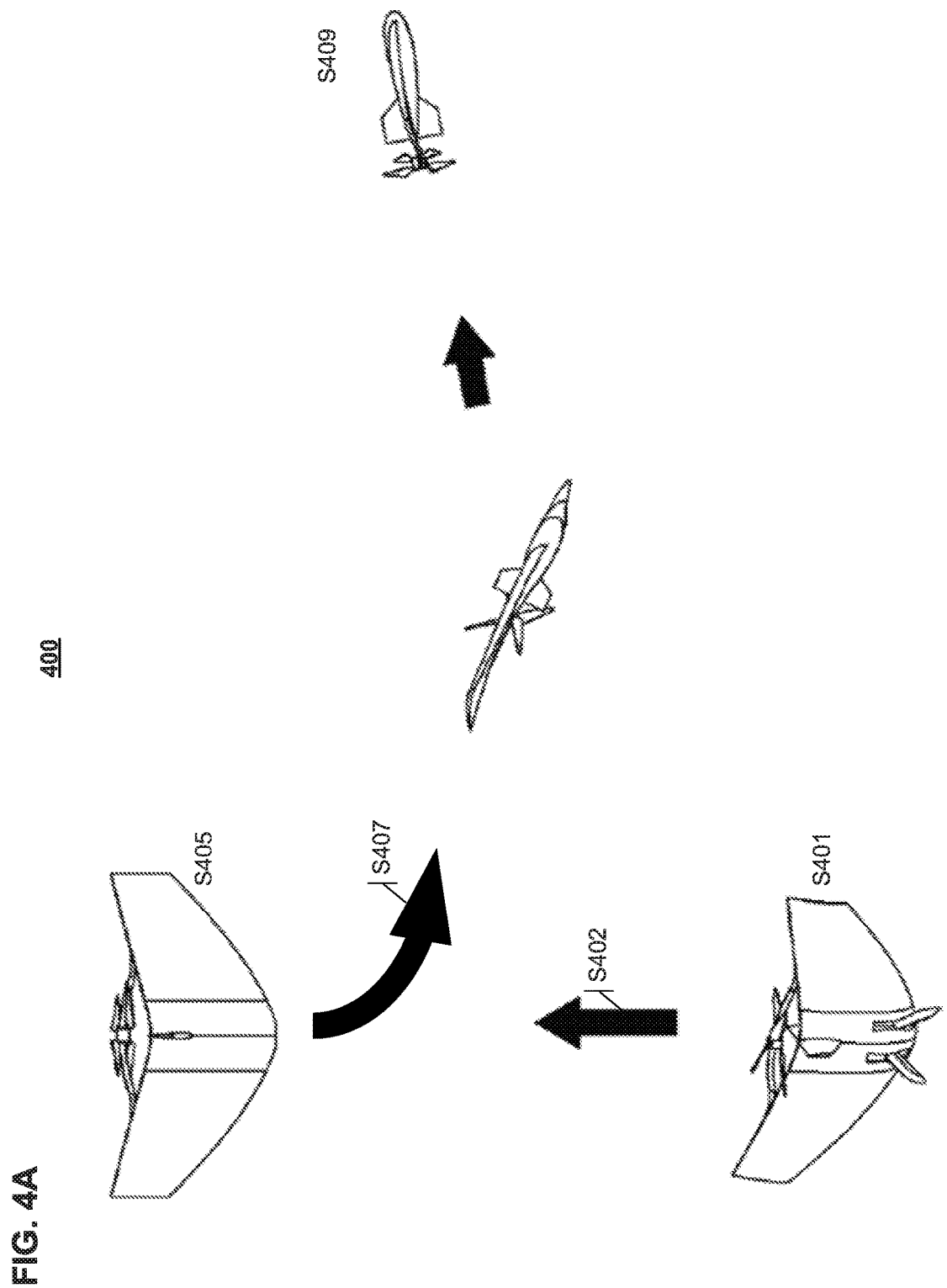
Figure 5A:
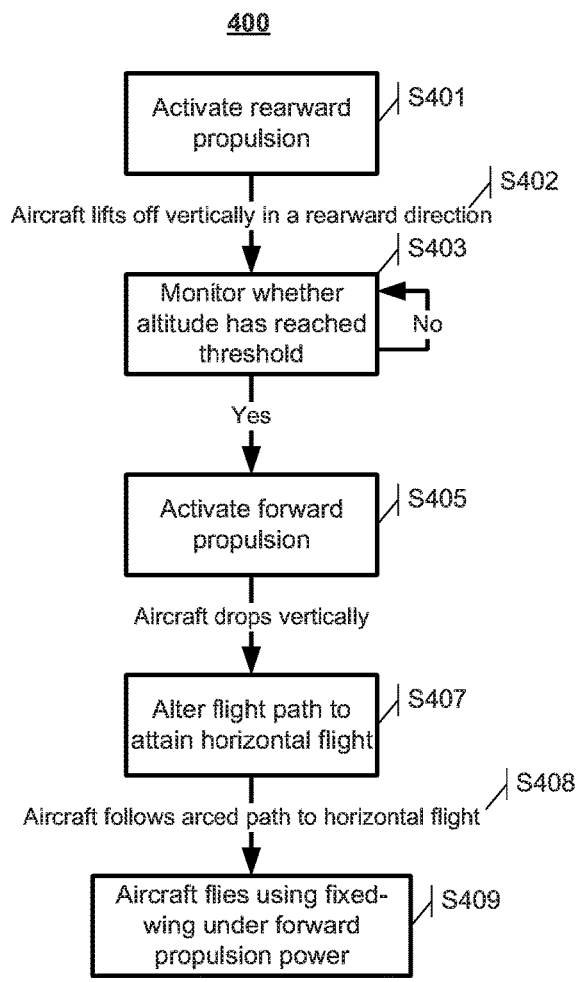
FIGS. 5A and 5B are simplified flow diagrams showing steps involved in the vertical takeoff and vertical landing, respectively, of the aircraft of FIG. 1A.
Figure 5B:
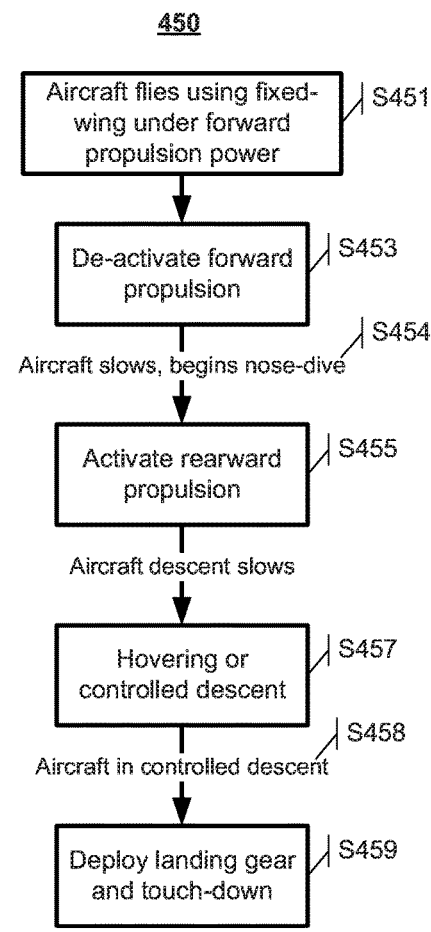

The vertical takeoff and landing of the aircraft will be described in more detail with reference to FIGS. 4A, 4B, 5A, and 5B. FIGS. 4A and 4B illustrate the vertical takeoff 400 and vertical landing 450 of the aircraft 100, respectively. FIGS. 5A and 5B are simplified flow diagrams showing steps involved in the vertical takeoff 400 and vertical landing 450 of the aircraft 100, respectively.

In the case of the vertical takeoff illustrated in FIGS. 4A and 5A, the takeoff procedure begins with the aircraft 100 positioned on its extended landing gear 109, and/or positioned in the base station 120, with its nose 101a pointed downwards and its wing 103 vertical. In step S401, the propulsion system 105 is activated to provide rearward propulsion. Specifically, the controller 102 controls the motor(s) to cause the contra-rotating propellers 105a and 105b to provide lift in a rearward direction. In response to the activation of the rearward propulsion, the aircraft 100 lifts off vertically in a rearward direction in step S402. Specifically, the aircraft moves in the direction of its tail 101b and in the direction of the trailing edge 103b of the wing 103. The aircraft 100 remains in the nose-down orientation, with its wing substantially vertical, as it rises in the air.

During the vertical lift-off, the controller 102 monitors the altitude of the aircraft 100 in step S403 to determine whether the aircraft 100 has reached a predetermined minimum altitude (or height) threshold. In general, the altitude threshold may be measured relative to the surface from which the aircraft 100 lifted off, although in some situations the altitude threshold is calculated as a minimum altitude above obstacles surrounding the aircraft (e.g., above tree-tops or buildings located near the takeoff location). While the monitored altitude remains below the threshold, the aircraft 100 remains in the vertical lift-off mode and continues to ascend under the power of the rearward propulsion provided by the propulsion system 105.

Once the altitude threshold is reached, the controller 102 controls the propulsion system 105 to switch operating modes in step S405. In this process, the rearward propulsion is deactivated and the forward propulsion is activated. For example, the controller 102 may cause the motor(s) to change the direction of rotation of the propellers 105a and 105b so as to provide the aircraft 100 with forward thrust.

As a result of the deactivation of the rearward propulsion, and as a result of the activation of the forward propulsion while the aircraft 100 is in the nose-down position, the aircraft 100 begins to vertically descend with its nose pointed substantially downwards. During the descent, the controller 102 alters the flight path of the aircraft 100 by activating the control surfaces 107 in step S407 in order to attain horizontal flight. As a result of the control, the aircraft 100 follows an arced flight path in step S408 to gradually reach a horizontal flight path.

In one example, for an aircraft 100 weighing 3 lbs, a predetermined minimum altitude of 100 feet (or approximately 30 meters) above obstacles surround the aircraft is used. In the example, the aircraft vertically descends for approximately 30 to 60 feet to reach a speed of 45 miles per hour. Once the speed is reached, the wing of the aircraft generates sufficient lift to enable the aircraft to enter the wing-flight mode by transitioning to horizontal fight.

Once on the horizontal flight path, the aircraft 100 flies using lift provided by the wing 103 under forward propulsion power provided by the propulsion system 105 in step S409. In this regard, the aircraft 100 has attained the wing-flight mode with its wing 103 positioned substantially horizontally. The aircraft 100 can ascend, descend, and bank sideways as part of its operation in the wing-flight mode.

In the foregoing description, the aircraft 100 thus transitions from the hovering-flight mode (in steps S401-S405) to the wing-flight mode (in steps S407-S409). In doing so, the aircraft 100 transitions from having its nose 101a pointed vertically downwards (and its wing 103 substantially vertical) to having its wing 103 substantially horizontal (with the aircraft moving in the direction of its nose 101a).

In the case of the vertical landing illustrated in FIGS. 4B and 5B, the landing procedure begins with the aircraft 100 in wing-flight mode flying with its wing 103 positioned substantially horizontally under forward propulsion power in step S451. In step S453, the controller 102 de-activates the forward propulsion power of the aircraft 100, for example by shutting off the motor(s). As a result of losing forward propulsion power, the aircraft 100 slows down, loses lift, and follows an arced flight path as it gradually begins to nose dive in step S454. Specifically, the aircraft 100 transitions from the horizontal flight position to a nose-down position.

In step S455, the controller 102 activates the rearward propulsion by activating the motor(s) and causing the contra-rotating propellers 105a and 105b to rotate. The activation of the rearward propulsion with the aircraft 100 in the nose-down position slows the descent of the aircraft. The descent in the nose-down position is either slowed sufficiently to proceed with a controlled descent in step S5457, and/or the descent is halted and the aircraft 100 proceeds to hover or vertically rise under power of the rearward propulsion.

Once the descent is under control, the aircraft 100 can control its descent in step S458. The control of the descent can include the controller 102 controlling the control surfaces 107 in order to steer and/or rotate the aircraft 100 during the hovering and descent. The steering and rotation can be used to align the aircraft with a landing surface or a base station 120. In step S459, the landing gear 109 is deployed and the aircraft 100 touches down softly on the ground or into a base station 120.

In the foregoing description, the aircraft 100 thus transitions from the wing-flight mode (in steps S451 and S453) to the hovering-flight mode (in steps S457-S459). In doing so, the aircraft 100 transitions from having its wing 103 substantially horizontal (with the aircraft moving in the direction of its nose 101a) to having its wing 103 being substantially vertical with the aircraft's nose 101a pointed vertically downwards.

The foregoing descriptions of the vertical takeoff 400 and landing 450 of the aircraft 100 have presented an illustrative ordering of steps. However, the disclosure is not limited to the particular order of steps presented herein, and certain re-ordering of steps falls within the scope of the disclosure. For example, the altering of the flight path in step S407 can happen concurrently with or before the activation of the forward propulsion in step S405. As another example, the activation of the rearward propulsion in step S455 can be performed concurrently with or before the slowing of the aircraft and the beginning of the nose-five in step S454. Other re-orderings of steps are also possible.

As described above, the controller 102 controls movement of the control surfaces 107 during both wing-flight mode and hovering-flight mode to alter the position, orientation, and movement of the aircraft 100 in both modes. For example, when the aircraft 100 is operating in the hovering-flight mode with its nose pointed downwards and its wing 103 substantially vertical, the control surfaces (e.g., 107b and 107c) disposed in line with thrust generated by the propellers 105a and 105b can be used to vector the propeller thrust and thereby move the aircraft 100. In this way, in situations in which the aircraft 100 is to hover in place, the controller 102 controls the controls surfaces 107 so as to rotate the aircraft 100 into a position in which the wing 103 is aligned with an ambient wind direction (e.g., such that a broad surface of the wind is parallel to the wind direction). In this way, the wing 103 does not significantly catch the wind, and the aircraft 100 does not significantly drift with the wind.

In accordance with the foregoing description, an aircraft, aircraft system, and control methods are provided that enable fixed-wing-aircraft based monitoring of large areas where vertical takeoff and landing are desirable. The disclosed method can be used to enable small unmanned aircraft including aircraft with fixed-wing configurations to achieve VTOL. In this way, an aircraft may include a body, a wing, at least two propellers, and a controller. The body has a nose and tail. The wing is fixed to the body. The propellers are co-axial and positioned at the tail. The controller has a first mode operable to rotate the propellers in different directions from each other. The controller also has a second mode operable to rotate the propellers in directions opposite to the first mode. An aircraft system includes the aircraft and a base operable to charge the aircraft. A method for flying the aircraft can include the aircraft taking off upward in nose-down positon with the controller in the first mode, and flying the aircraft in nose front position with the controller in the second mode.

In various examples, the VTOL is based on the assumption of a nose-down position for takeoff. By assuming such a position, the aircraft can utilize the same control surfaces for fixed wing flight as for thrust vectoring while hovering, taking off, or landing nose-down. The thrust is provided by contra-rotating co-axial propellers which allow for stable vertical thrust without need for additional stabilizers for vertical takeoff, as well as redundancy for maintaining horizontal flight. The aircraft thereby provides a light and simple design for achieving VTOL by repurposing the same thrust and control systems used for hovering and horizontal flight. This can provide a lighter, simpler aircraft that requires less maintenance and is better suited for use on light electric crafts than previously utilized methods of achieving VTOL.

By using contra-rotating propellers, the aircraft can efficiently produce thrust while also applying torques counter to one another, to increase stability of the drone both in fixed wing and nose-down hovering orientations.

The craft can achieve stable hovering by transitioning from fixed wing flight into its nose-down position such that any wind runs parallel to its broad side, reducing instability caused by drag. It is then possible for the aircraft to compensate for remaining drag with thrust vectoring.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. An aircraft comprising:
   a fixed wing having a leading edge and a trailing edge;
   a propulsion system operative to selectively provide forward propulsion and rearward propulsion; and
   a controller operative to control operation of the propulsion system to provide rearward propulsion during takeoff of the aircraft to move the aircraft in a direction of the trailing edge of the fixed wing, and to provide forward propulsion during flight of the aircraft to move the aircraft in a direction of the leading edge of the fixed wing.

2. The aircraft of claim 1, wherein the controller is operative to control positioning of the aircraft to maintain the aircraft with the trailing edge of the fixed wing facing upwards during takeoff of the aircraft when the propulsion system provides rearward propulsion, and to maintain the aircraft with the wing substantially horizontal during flight when the propulsion system provides forward propulsion.

3. The aircraft of claim 1, wherein the propulsion system is operative to provide rearward propulsion sufficient to lift the aircraft vertically with the trailing edge of the fixed wing facing upwards, and
   the controller is operative to control operation of the propulsion system to provide rearward propulsion to lift the aircraft vertically with the trailing edge of the fixed wing facing upwards during takeoff of the aircraft.

4. The aircraft of claim 1, wherein the propulsion system comprises at least two contra-rotating propellers configured to rotate in opposite directions.

5. The aircraft of claim 4, wherein the at least two propellers are co-axial contra-rotating propellers that rotate in opposite directions about a same axis.

6. The aircraft of claim 1, further comprising:
   movable control surfaces disposed on the trailing edge of the fixed wing and operative to control movement of the aircraft during flight when the propulsion system provides forward propulsion,
   wherein the movable control surfaces are disposed within a line of thrust of the propulsion system and are operative to control movement of the aircraft during takeoff when the propulsion system provides rearward propulsion.

7. The aircraft of claim 1, wherein the propulsion system is fixed relative to the fixed wing and provides forward and rearward propulsion along an axis parallel to an axis extending from the leading edge to the trailing edge of the fixed wing.

8. The aircraft of claim 1, wherein the fixed wing is shaped to provide lift as a result of airflow around the wing from the leading edge towards the trailing edge.

9. A method comprising:
activating a propulsion system of an aircraft having a fixed wing to provide rearward propulsion of the aircraft during takeoff and move the aircraft vertically upward in a direction of a trailing edge of the fixed wing;
monitoring an altitude of the aircraft during the takeoff; and
upon determining that the aircraft has reached a predetermined altitude threshold, causing the propulsion system to provide forward propulsion to the aircraft and move the aircraft in a direction of a leading edge of the fixed wing opposite to the trailing edge.

10. The method of claim 9, further comprising:
during activation of the propulsion system to provide rearward propulsion, controlling positioning of the aircraft to maintain the aircraft with the fixed wing substantially vertical during takeoff of the aircraft when the propulsion system provides rearward propulsion.

11. The method of claim 10, further comprising:
upon determining that the aircraft has reached a predetermined altitude threshold, controlling positioning of the aircraft to position the aircraft with the wing substantially horizontal during flight when the propulsion system provides forward propulsion.

12. The method of claim 11, wherein the wing is shaped to provide lift as a result of airflow around the wing from the leading edge towards the trailing edge.

13. The method of claim 9, wherein:
the propulsion system comprises at least two contra-rotating propellers configured to rotate in opposite directions,
the activating the propulsion system to provide rearward propulsion comprises causing a first propeller of the at least two propellers to turn in a first direction, and
the causing the propulsion system to provide forward propulsion comprises causing the first propeller of the at least two propellers to turn in a direction opposite to the first direction.

14. The method of claim 13, wherein the at least two propellers comprise co-axial contra-rotating propellers that rotate in opposite directions about a same axis.

15. A method comprising:
activating a propulsion system of an aircraft having a fixed wing to provide forward propulsion of the aircraft during flight of the aircraft and maintaining the fixed wing in a substantially horizontal position; and
transitioning the aircraft to a hovering or vertically descending mode by performing steps for:
de-activating the propulsion system providing forward propulsion;
controlling the aircraft to perform a nose-dive with the fixed wing in a substantially vertical position and a nose of the aircraft pointed downwards; and
activating the propulsion system to provide rearward propulsion to the aircraft to slow movement of the aircraft vertically downwards with the nose of the aircraft pointed downwards.

16. The method of claim 15, wherein the fixed wing is shaped to provide lift as a result of airflow around the wing during flight of the aircraft under forward propulsion.

17. The method of claim 15, wherein:
the propulsion system comprises at least two contra-rotating propellers configured to rotate in opposite directions,
the activating the propulsion system to provide forward propulsion comprises causing a first propeller of the at least two propellers to turn in a first direction, and
the causing the propulsion system to provide rearward propulsion comprises causing the first propeller of the at least two propellers to turn in a direction opposite to the first direction.

18. The method of claim 17, wherein the at least two propellers comprise co-axial contra-rotating propellers that rotate in opposite directions about a same axis.

19. The method of claim 15, further comprising:
controlling movement of movable control surfaces disposed on a trailing edge of the fixed wing to control movement of the aircraft during flight when the propulsion system provides forward propulsion,
wherein the movable control surfaces are disposed within a line of thrust of the propulsion system and are operative to control movement of the aircraft when in the hovering or vertically descending mode when the propulsion system provides rearward propulsion.

* * * * *